US 8,739,986 B2

(12) United States Patent
Preidt et al.

(10) Patent No.: US 8,739,986 B2
(45) Date of Patent: Jun. 3, 2014

(54) RETAIL CART

(75) Inventors: Ludwig Klaus Preidt, Grand Rapids, MI (US); Karl Ronald Chapel, Grand Haven, MI (US)

(73) Assignee: Effizient, LLC, Grand Haven, MI (US)

( * ) Notice: Subject to any disclaimer, the term of this patent is extended or adjusted under 35 U.S.C. 154(b) by 24 days.

(21) Appl. No.: 13/314,883

(22) Filed: Dec. 8, 2011

(65) Prior Publication Data
US 2013/0146553 A1   Jun. 13, 2013

(51) Int. Cl.
*A47B 43/00* (2006.01)
*A47B 91/00* (2006.01)
*B62B 1/00* (2006.01)

(52) U.S. Cl.
USPC ............. 211/188; 108/187; 280/79.3

(58) Field of Classification Search
CPC .. A47B 87/0246; A47B 57/06; A47B 47/021; A47B 57/265; A47B 57/545; A47B 87/0207; A47B 47/045; A47B 47/04; A47B 47/02; A47B 47/022; A47B 47/0058; A47B 47/0008; B65G 1/02; A47F 5/01; A47F 7/0021; A47F 5/13
USPC ............. 211/133.5, 134, 151, 153, 186, 188, 211/192, 194; 108/180, 181, 186, 187, 189; 280/47.35, 79.11, 79.3
See application file for complete search history.

(56) References Cited

U.S. PATENT DOCUMENTS

| | | | | |
|---|---|---|---|---|
| 2,864,512 A | * | 12/1958 | Hoose | 108/181 |
| 2,891,677 A | * | 6/1959 | Ritchie | 211/59.2 |
| 2,919,816 A | * | 1/1960 | Maslow | 108/181 |
| 3,007,708 A | * | 11/1961 | Ochs | 280/33.998 |
| 3,145,850 A | * | 8/1964 | Ciborowski | 211/133.5 |
| 3,146,735 A | * | 9/1964 | Kesilman et al. | 108/181 |
| 3,252,434 A | * | 5/1966 | Young, Jr. | 108/181 |
| 3,536,016 A | * | 10/1970 | Chesley | 108/181 |
| 3,589,746 A | * | 6/1971 | Inglis et al. | 280/79.3 |
| 3,696,763 A | * | 10/1972 | Evans | 108/157.13 |
| 3,730,108 A | * | 5/1973 | Stroh | 108/108 |
| 3,977,529 A | * | 8/1976 | Stroh | 211/187 |
| 3,977,689 A | * | 8/1976 | Rosa | 280/33.996 |
| 4,045,043 A | * | 8/1977 | Fourrey | 280/79.3 |
| 4,231,298 A | * | 11/1980 | Pollack | 108/64 |
| 4,593,826 A | * | 6/1986 | Bustos | 211/187 |
| 5,065,873 A | * | 11/1991 | Tseng | 211/187 |
| 5,718,441 A | * | 2/1998 | Kern et al. | 280/79.3 |
| 6,173,847 B1 | * | 1/2001 | Zellner et al. | 211/186 |
| 6,460,710 B1 | * | 10/2002 | Dardashti | 211/184 |
| 6,659,294 B1 | * | 12/2003 | Simard | 211/181.1 |
| 8,025,148 B2 | * | 9/2011 | Artinger | 206/518 |
| 8,079,313 B2 | * | 12/2011 | Sparkowski | 108/110 |
| 8,196,761 B2 | * | 6/2012 | Morandi | 211/186 |
| 2005/0218096 A1 | * | 10/2005 | Dunn | 211/153 |
| 2007/0158289 A1 | * | 7/2007 | Chen | 211/186 |
| 2011/0220602 A1 | * | 9/2011 | Chen | 211/153 |

* cited by examiner

*Primary Examiner* — Joshua J Michener
*Assistant Examiner* — Devin Barnett
(74) *Attorney, Agent, or Firm* — Price Heneveld LLP (57) ABSTRACT

A retail cart for use in storing and stocking merchandise and, more particularly, to a mobile polymeric retail cart which is easily assembled and disassembled without the need for tools having opposing forces in its construction lending rigidity to the overall structure and a plurality of slideably received shelving units.

17 Claims, 12 Drawing Sheets

RETAIL CART

FIELD OF THE INVENTION

The present invention generally relates to a retail cart for use in storing and stocking merchandise and, more particularly, to a mobile polymeric retail cart which is easily assembled and disassembled without the need for tools.

BACKGROUND OF THE INVENTION

Retail or merchandise carts are known in the art for use in storing and stocking merchandise at a retail location. Generally, these carts are mobile carts with an upright frame assembly made from metal. These metal frame assemblies provide sound structure and rigidity for the retail carts, however, they are heavy and often require special tooling to assemble the frame as well as to attach the frame on a mobile base.

The present invention provides a polymeric retail cart having the structural rigidity necessary to support a vertical frame assembly while being composed of polymeric materials for decreasing the weight of the overall unit and, thereby increasing the ease of mobility of the unit.

SUMMARY OF THE INVENTION

One aspect of the present invention includes a retail cart for use in transporting merchandise, comprising a base unit having an upper side and an underside with a plurality of mobile transport rollers coupled to the underside of the base unit. First and second side attachment members are operably coupled to the upper side of the base unit in a generally upright, parallel, laterally spaced-apart relationship. Each side attachment member includes an outer frame member comprising an upper crossbar, a lower crossbar and laterally spaced uprights. A plurality of support members having shelf receiving channels are disposed between the laterally spaced uprights of each side attachment member. At least one shelving unit is slideably and removably received in the shelf receiving channels of the support members. The retail cart is adapted to support a number of different shelving units. At least one handle member is operably coupled to an upright of the first side attachment member at a first end and operably coupled to an upright of the second side attachment member at a second end. A plurality of stabilizers are removably and operably coupled to an upright of the first side attachment member at a first end and operably coupled to an upright of the second side attachment member at a second end.

Another aspect of the present invention includes a retail cart for use in transporting merchandise, comprising a base unit having an upper side and an underside wherein a plurality of mobile transport rollers are coupled to the underside of the base unit. First and second side attachment members are operably coupled to the upper side of the base unit in a generally upright, parallel, laterally spaced-apart relationship, wherein each side attachment member includes a frame member comprising upper and lower crossbars and laterally spaced uprights with a plurality of support members disposed between the laterally spaced uprights having shelf receiving channels. A plurality of stabilizers are operably coupled to an upright of the first side attachment member at a first end and operably coupled to an upright of the second side attachment member at a second end. A plurality of removable shelving units are slideably received in the shelf receiving channels of the support members. The shelving units further include a landing surface disposed between laterally spaced apart retaining edges having upper cross bars, wherein the upper crossbars are positively captured between an upright of the first side attachment member at a first end and an upright of the second side attachment member at a second end when the shelving unit is in a fully stowed position thereby imparting a first force on the first and second side attachment members. The shelving units further include a plurality of downwardly facing shelving unit support guides disposed adjacent to the landing surface for engaging the shelf receiving channels of the support members thereby imparting a second force on the support members in opposition to the first force.

Yet another aspect of the present invention includes a retail cart for use in transporting merchandise, comprising a base unit having an upper side and an underside wherein a plurality of mobile transport rollers are coupled to the underside of the base unit. First and second side attachment members are detachably coupled to the upper side of the base unit in a generally upright, parallel, laterally spaced-apart relationship, wherein each side attachment member includes a one-piece polymeric frame member comprising an upper crossbar, a lower crossbar and laterally spaced uprights. A plurality of stabilizers are operably coupled to an upright of the first side attachment member at a first end and operably coupled to an upright of the second side attachment member at a second end. A plurality of support members are disposed between the laterally spaced uprights of each of the side attachment members having shelf receiving channels disposed thereon. At least one shelving unit is slideably and removably received in the shelf receiving channels of the support members.

These and other features, objects and advantages of the present invention will become apparent upon reading the following description thereof together with reference to the accompanying drawings.

DETAILED DESCRIPTION OF THE PREFERRED EMBODIMENT

Figure 1:
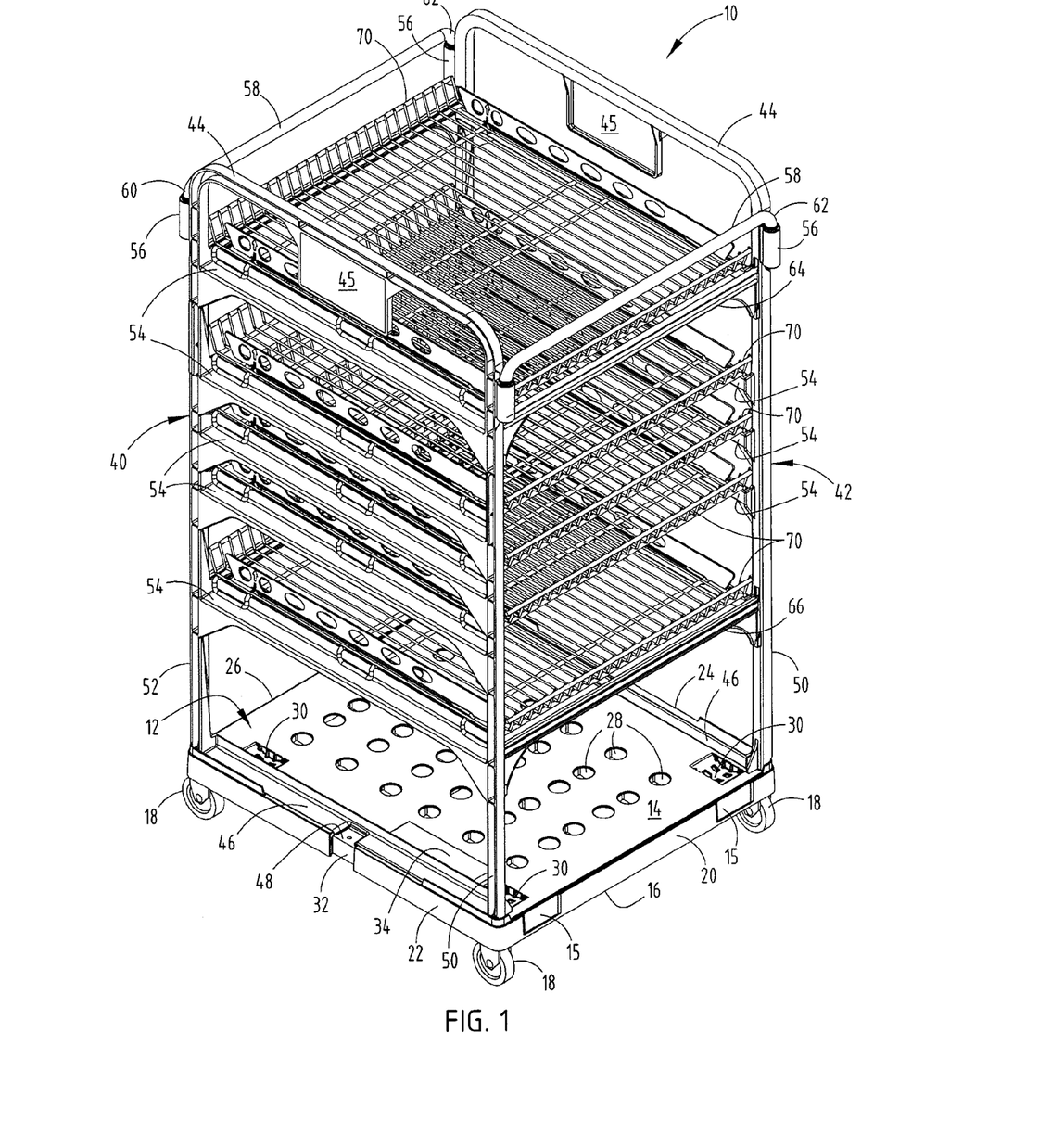
FIG. 1 is a perspective view of a retail cart according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates a retail cart of the present invention. The retail cart includes a base unit 12 having an upper surface 14 and a lower surface 16. As shown in FIG. 1, the base unit 12 has a plurality of mobile transport rollers 18 operably coupled to the underside or lower surface 16 of the base unit 12. In the embodiment shown in FIG. 1, the mobile transport rollers 18 are in the form of casters which can be rigid or swivel casters known in the art. The base unit 12 comprises a front wall 20, first and second side walls 22, 24, and a rear wall 26, giving the base unit 12 an overall rectangular configuration. The upper surface 14 defines a landing area having a plurality of apertures 28 disposed thereon. The upper surface or upper side 14 of the base unit 12 further comprises detents 30 disposed in the four corners of the upper surface 14, which are configured to house mobile transport rollers of an additional base unit when one base unit is stacked upon another. The detents 30 are designed to retain the mobile transport rollers or casters of an additional base unit during transport. The side walls 22, 24 further comprise recessed areas 32 which extend around the side walls 22, 24 to the upper surface 14 of the base unit 12 to provide a nip for use in coupling the base unit 12 to a side attachment member as further described below. Upper surface 14 of base unit 12 further comprises a smooth flat area 34, which is adapted to receive a warning or other type of informational label. It is noted that the front wall 20, rear wall 26, and side walls 22, 24 of the base unit 12 can be configured with brand information tailored to the retail location for which the retail cart 10 will be used. Specifically, label areas 15 disposed on the front wall 20 of the cart 10 can be used to display bar code labels containing identifying information about the cart, the retail location, or the merchandise stored in the cart. In the embodiment shown in FIG. 1, the base unit 12 is comprised of a polymeric material having internal structural reinforcements disposed between the upper and lower surfaces 14, 16.

The retail cart 10 of the present invention further comprises first and second side attachment members 40, 42 which essentially create a structure for the retail cart 10. The first and second side attachment members 40, 42 are operably coupled to the base unit 12 as further described below. The first and second side attachment members 40, 42 are shown in FIG. 1 as one piece polymeric side attachment members having the same overall configuration as compared to the other. Thus, as shown in FIG. 1, first side attachment member 40 is disposed on the base unit 12 adjacent the side wall 22. First side attachment member 40 can also be rotated and coupled to the base unit 12 on the right side of the base unit 12 adjacent side wall 24. Likewise, second side attachment member 42, as shown in FIG. 1, can occupy the left side of the base unit 12 adjacent side wall 22. In this way, the retail cart 10 is easily assembled as the side attachment members 40, 42 are not designated for a specific attachment location on the base unit 12. The first and second side attachment members 40, 42, as shown in FIG. 1 are contemplated to be 1-piece units made from injection molded thermal reinforced plastic. The retail cart is largely comprised of injection molded thermal reinforced plastic parts, such that the cart is lightweight, as compared to metal carts known in the art, and therefore is more easy to assemble without the need for specific tools. Given that the first and second side attachment members 40, 42 have the same overall configuration, their parts will be described using the same reference numerals for each.

The first and second side attachment members 40, 42 include an overall outer frame member comprising upper crossbars 44, lower crossbars 46, front uprights 50, and rear uprights 52. The lower crossbars 46 further comprise recesses 48 for aligning the lower crossbar 46 with the recessed area or nip 32 disposed on the upper surface 14 of the base unit 12. First and second side attachment members 40, 42 are coupled to the upper side 14 of base unit 12 in a generally upright, parallel, and laterally spaced-apart relationship. The front uprights 50 and rear uprights 52 are laterally spaced-apart with a plurality of support members 54 disposed therebetween. Support members 54 are adapted to receive shelving units 70 as further described below. Disposed on an upper portion of the forward uprights 50 and on an upper portion of the rearward uprights 52, receiving channels 56 are disposed. As shown in FIG. 1, receiving channels 56 are shown in the form of tube-like assemblies disposed on both the front and rear uprights 50, 52.

In assembly, receiving channels 56 receive a handle member 58 which, as shown in the embodiment of FIG. 1, is a substantially U-shaped handle member. Handle members 58 operably couple the first side attachment member 40 to the second side attachment member 42. Each handle member 58 has a first side 60 and a second side 62 (see FIG. 4) wherein the first side 60 is coupled to the first side attachment member 40 at receiving channel 56 and the second end 62 of the handle member 58 is coupled to the second side attachment member 42 at receiving channel 56. The first and second side attachment members 40, 42 are further connected via upper and lower stabilizers 64, 66 which connect the front uprights 50 of the first and second side attachment members 40, 42 in a removable snap-in fashion as further described below. Upper and lower stabilizers 64, 66 are further disposed between the rear uprights 52 of the first and second side attachment members 40, 42, thereby connecting the side attachment members.

Figure 2:
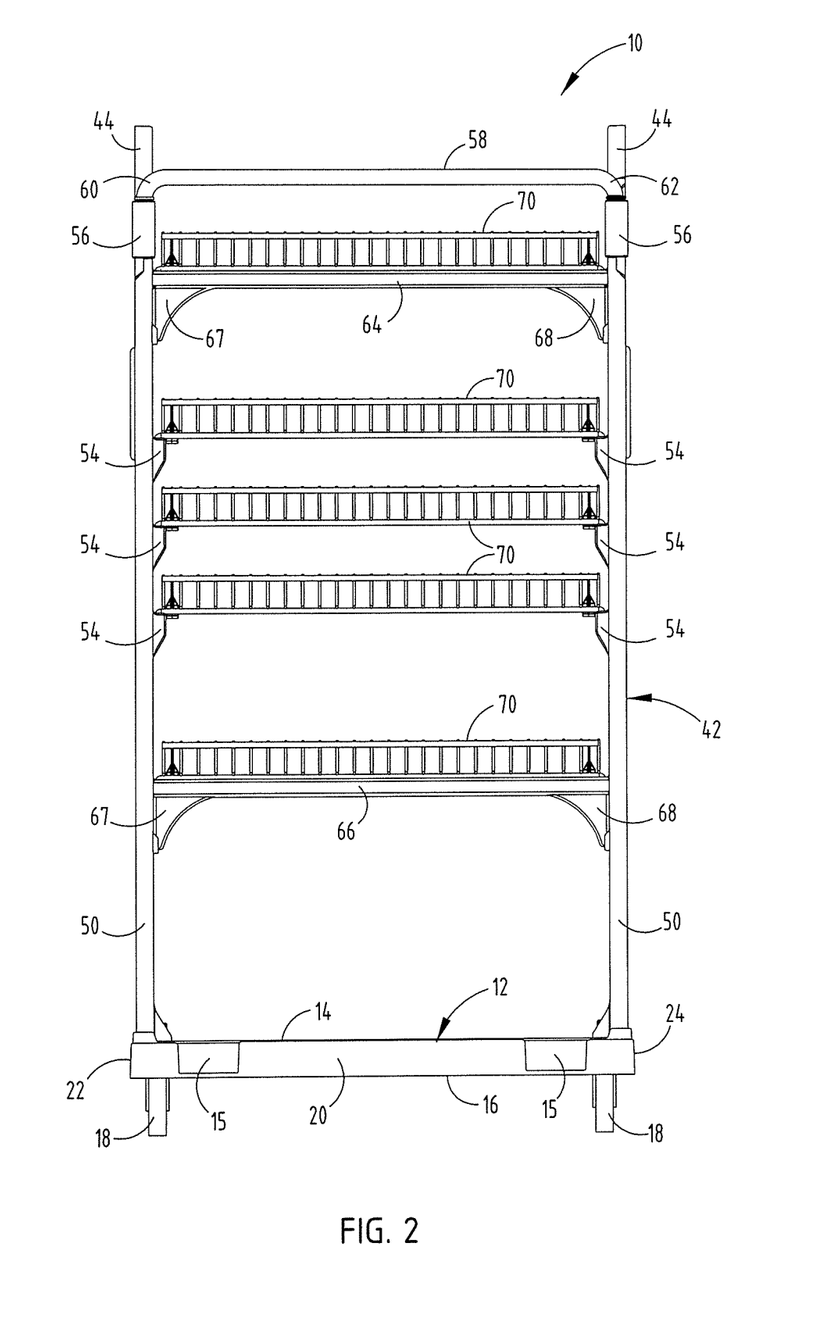
FIG. 2 is a front elevational view of the retail cart as shown in FIG. 1.

As shown in FIG. 2, the retail cart 10 has a plurality of shelving units 70 which are vertically spaced along a vertical length of the first and second side attachment members 40, 42. In the front elevational view of the retail cart 10 as shown in FIG. 2, the upper and lower stabilizers 64, 66 have first and second sides 67, 68. In this way, the upper and lower stabilizers 64, 66 form a plurality of stabilizers which are coupled to the front uprights 50 of both the first side attachment member 40 and the second side attachment member 42. Specifically, the first end 67 of the upper and lower stabilizers 64, 66 is coupled to the first side attachment member 40 and the second end 68 of the upper and lower stabilizer 64, 66 is attached to the second side attachment member 42. As noted above, the stabilizers 64, 66 are removably coupled to the first and second side attachment members 40, 42 on the front and rear uprights 50, 52. With the stabilizers 64, 66 in place, the retail cart 10 has sufficient rigidity to move and support merchandise as intended. The rigidity provided by the stabilizers 64, 66, which, for purposes of the present invention, are polymeric stabilizers, allows for the frame components of the retail cart 10 to be made of a lightweight polymeric material which decreases the overall weight of the cart without sacrificing utility and stability.

Figure 3:
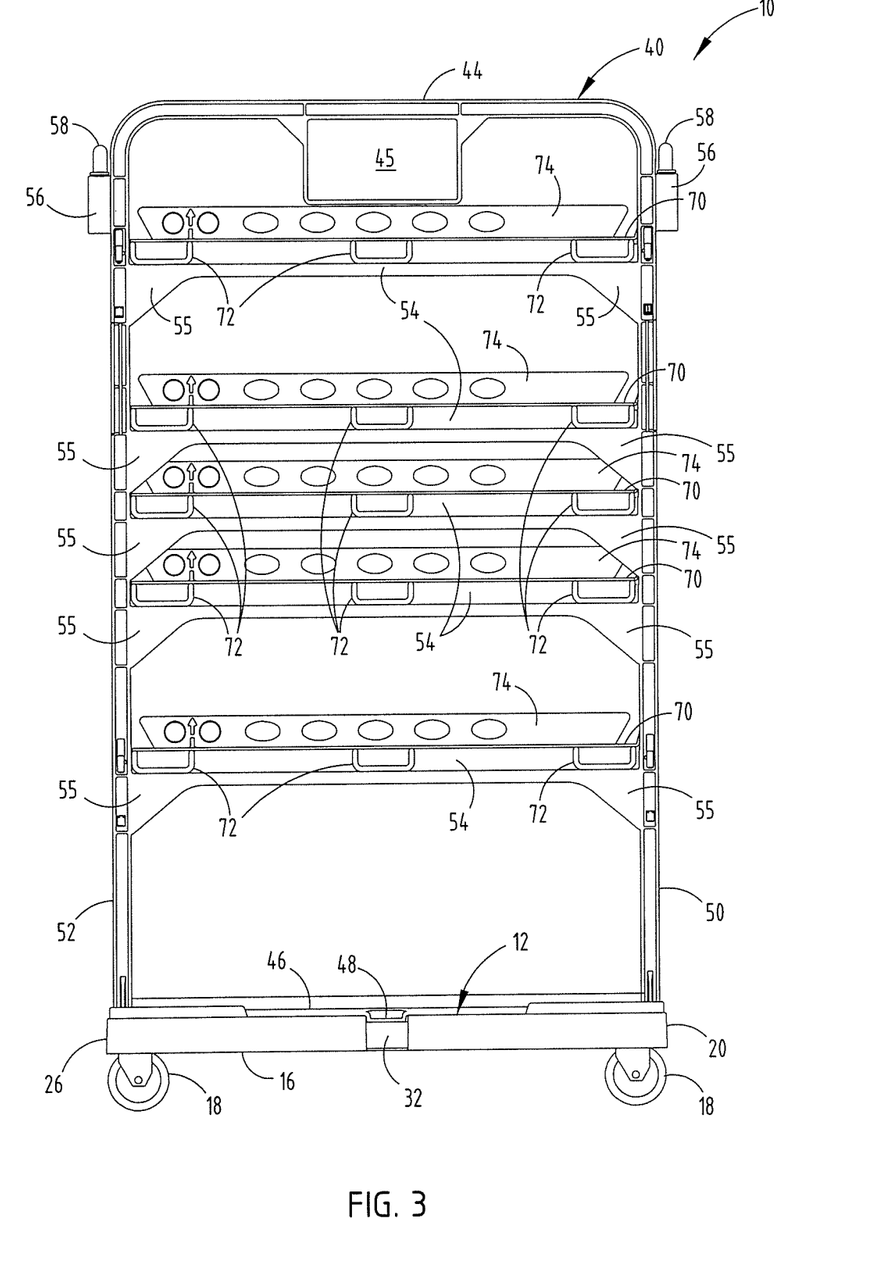
FIG. 3 is a side elevational view of a retail cart as shown in FIG. 1.

Referring now to FIG. 3, the side elevational view of the retail cart 10 shows the retail cart having the first side attachment member 40 with an upper crossbar 44 having a display area 45 attached thereto. In use, the display area can contain warning information and instructional information for proper use of retail cart 10. The retail cart 10, as shown in FIG. 3, has support members 54 which further comprise gusseted ends 55 for reinforced attachment of the support members 54 to the front and rear uprights 50, 52. The support members 54 further comprise receiving channels 110 for receiving the shelving units 70 as further describe below with reference to FIGS. 5A-5C. In the embodiment shown in FIG. 3, the retail cart 10 is shown with five support members 54 supporting five shelving units 70. It is noted that the shelving units 70 are slideably received on the support members 54 in the receiving channels 110 using, in part, shelving unit support guides 72 which are disposed along a length of the shelving units 70 as further described below in connection with FIGS. 6-8. The removable, slideably received shelving units 70 further comprise detachable dividers 74 for organizing and dividing merchandise as stocked on the shelving unit 70.

As shown in FIG. 3, the base unit 12 having a side wall 22 further comprises a recessed area 32 which matingly receives a recess 48 disposed in the lower crossbar 46 of the first side attachment member 40 for aligning the first side attachment member 40 for attachment to the base unit 12. In assembly, it is contemplated that a hand-turned locking mechanism is received in an aperture disposed on the recessed portion 48 of lower crossbar 46 and further received in the recessed area 32 of side wall 22 of base unit 12 for securely attaching the first side attachment member 40 to the base unit 12 in such a manner that tools are not required. The aperture disposed in the lower crossbar 46 in the recessed portion 48 of the side attachment member 40 is indicated as aperture 49 in FIG. 4, and the aperture disposed in the recessed portion 32 of side wall 22 of base unit 12 is identified as aperture 33 in FIG. 4.

Figure 4:
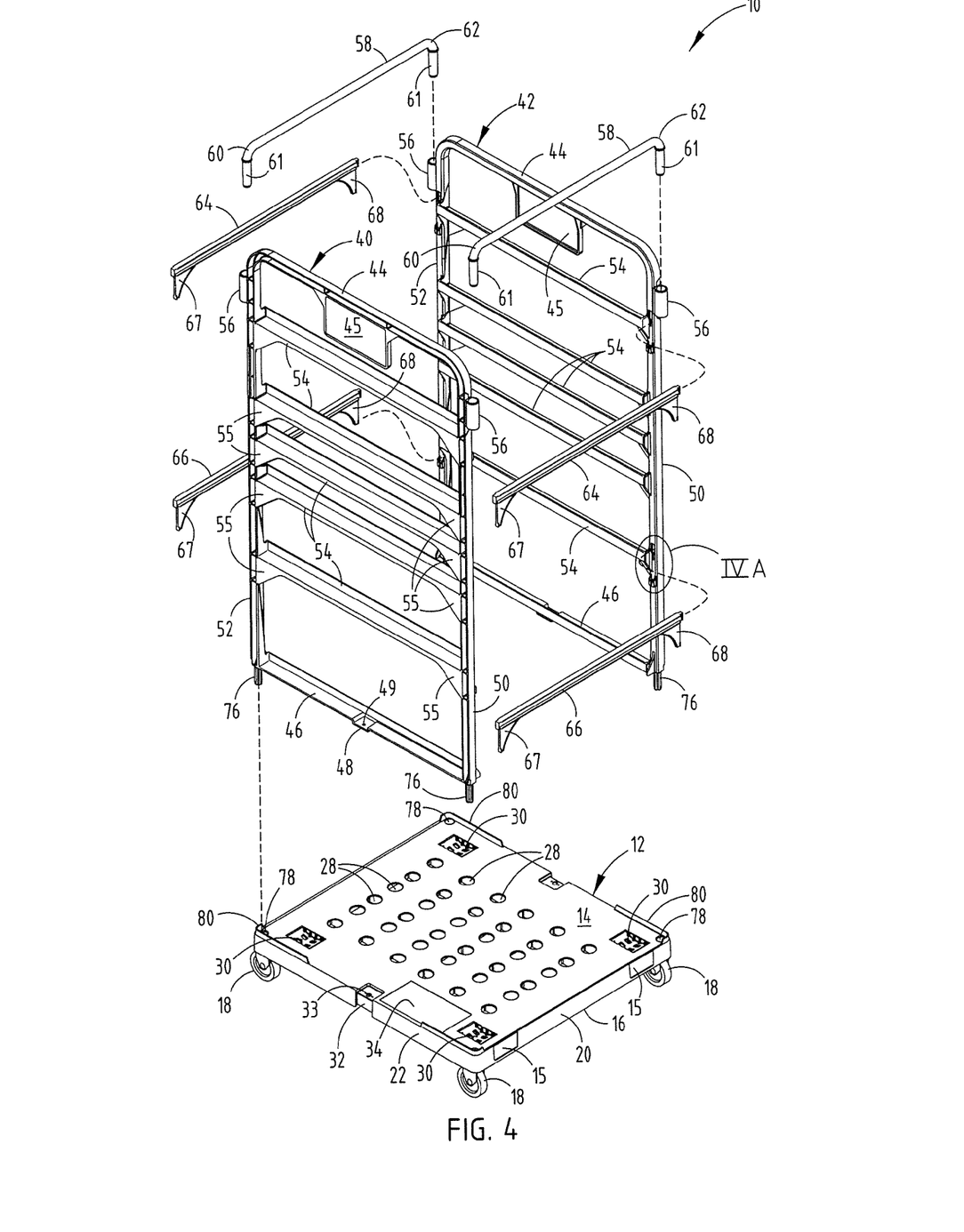
FIG. 4 is a perspective exploded view of a retail cart according to embodiments of the present invention.

Referring now to FIG. 4, the retail cart 10 is shown in an exploded view in a similar perspective orientation as shown in FIG. 1. In the embodiment shown in FIG. 4, the slideably received and removable shelving units 70 have been removed. First and second side attachment members 40, 42 have connecting members 76 disposed at the lower ends of the front and rear uprights 50, 52. In assembly and as indicated by the dotted lines in FIG. 4, the connecting members 76 are slideably and frictionally received in apertures 78 approximately disposed in the corners of the upper surface 14 of base unit 12. Upper surface 14 of base unit 12 further comprises retaining walls 80 which help guide the attachment of the first and second side attachment members 40, 42 in assembly. In this way, first and second side attachment members 40, 42 can be frictionally fit into base unit 12 by receiving of the connecting members 76 into the connecting apertures 78 as guided by retainment walls 80. Near the upper portion of the front and rear uprights 50, 52 of the first and second side attachment members 40, 42, receiving channels 56, shown in the embodiment in FIG. 4 as tube-like receiving channels, are adapted to engage connecting members 61 of the first and second sides 60, 62 of the handle member 58. Thus, the first and second side members 40, 42 can be slideably, removably and frictionally coupled to the base unit 12 by the receiving of the connecting members 76 into connecting apertures 78 disposed on upper surface 14 of base unit 12.

Once a first or second side attachment member 40, 42 is received in this way on base unit 12, the first or second side attachment member 40, 42 will stand on its own in an upright orientation, such that the user assembling the retail cart 10 can fasten the first or second side attachment member using a fastener mechanism disposed in recess 48 of the lower crossbar 46 of the first or second side attachment member 40, 42. With the side attachment members 40, 42 in place, the retail cart assembler can then install the handle members 58 by slideably, removably and frictionally fitting the connecting members 61 disposed on the first and second sides 60, 62 of the handle member 58 into the receiving channels 56 disposed on the upper ends of the front and rear uprights 50, 52 of the first and second side attachment members 40, 42. With the first and second side attachment members 40, 42 operably coupled to base unit 12 on a lower end and operably coupled to each other via handle members 58 at an upper end, a basic upright rectangular structural frame is formed. The basic structural frame includes the first and second side attachment members 40, 42 being positioned in an upright, parallel, laterally spaced-apart relationship to one another as attached to the upper side 14 of base unit 12.

An outer frame structure of the side attachment members 40, 42 comprises an upper crossbar 44, a lower crossbar 46, and laterally spaced uprights 50, 52. As further shown in FIG. 4, first and second side attachment members 40, 42 further comprise a plurality of support members 54 having gusseted ends 55 wherein support members 54 are disposed between the laterally spaced front and rear uprights 50, 52 of each side attachment member 40, 42 adding support and rigidity to the retail cart.

As further shown in FIG. 4, the retail cart 10 comprises a plurality of stabilizers specifically identified as upper and lower stabilizers 64, 66. The upper and lower stabilizers 64, 66 are operably coupled to the first side attachment member 40 at a first end 67 and operably coupled to the second side attachment member 42 at a second end 68. In the embodiment shown in FIG. 4, upper stabilizers 64 and lower stabilizers 66 are connected to the front and rear uprights 50, 52 of both the first and second side attachment members 40, 42, thus, coupling the first and second side attachment members 40, 42 in a manner similar to the coupling of the side attachment members 40, 42 by handle members 58. The stabilizers further increase the rigidity of the polymeric structure of the retail cart 10. The upper and lower stabilizers 64, 66 are generally of the same configuration and are removably coupled to the front and rear uprights 50, 52 of the first and second side attachment members 40, 42, as further described with reference to FIGS. 4A and 4B.

Figure 4A:
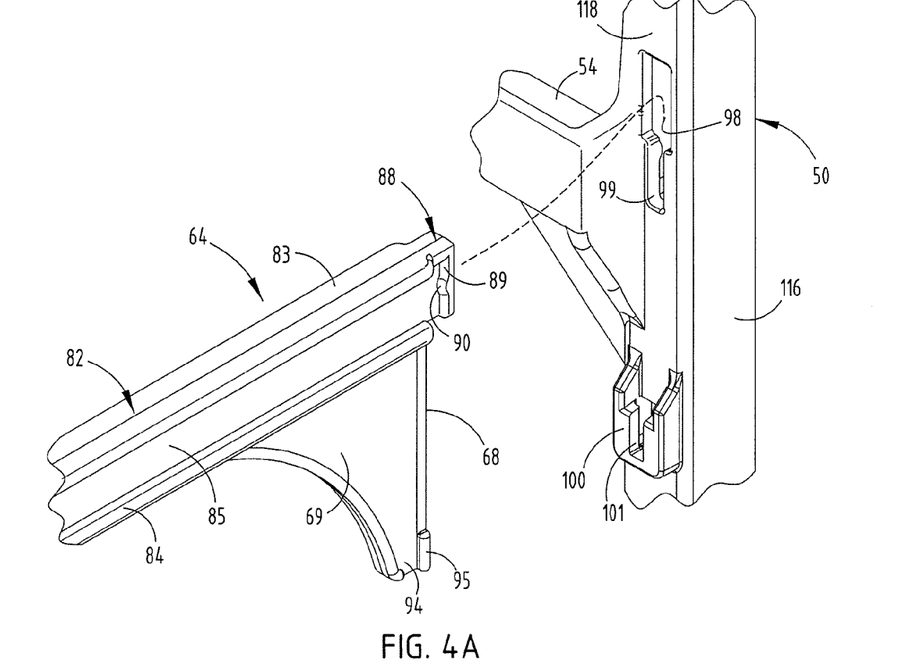
FIG. 4A is fragmentary perspective views of a stabilizer and an upright of the present invention.
Figure 4B:
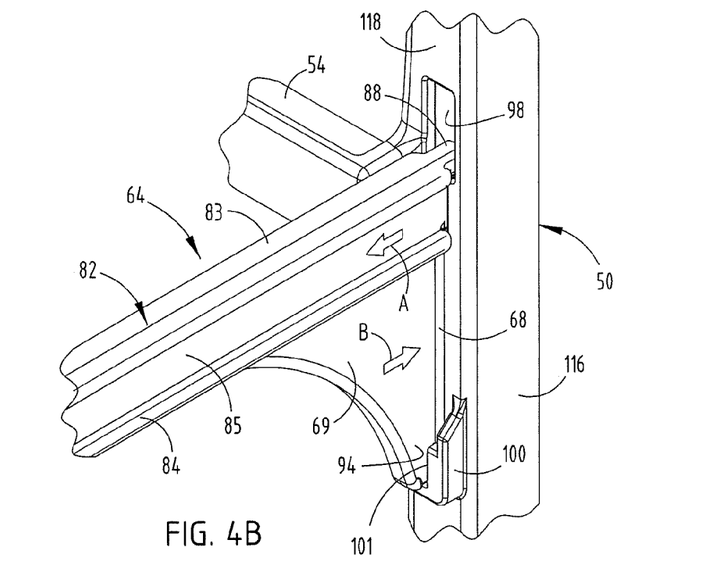
FIG. 4B is fragmentary perspective views of a stabilizer and an upright of the present invention.

Referring now to FIGS. 4A and 4B, a stabilizer, indicated here as an upper stabilizer 64 but which may also be a lower stabilizer 66, is shown as connected to an upright, which in FIGS. 4A and 4B is shown as a front upright 50, of either a first or second side attachment member 40, 42. As shown in FIG. 4A, the stabilizer 64 comprises an upper crossbar 82 which has a generally I-beam configuration comprised of a top wall 83, a bottom wall 84, and a middle section 85 connecting the top wall 83 and bottom wall 84. At a second end 68 of the stabilizer 64, a gusset 69 is disposed extending off the bottom wall 84 of the top crossbar 82. In assembly, the gusset 69 lends support and rigidity to the stabilizer 64. Disposed at a distal end of the top crossbar 82, a snap-fit attachment flange 88 is disposed. The snap-fit attachment flange 88 comprises a retaining member 89 having a biasing member 90 disposed thereon. Disposed at a lower end of the gusset 69 is a lower attachment flange 94 having a retainment member 95.

Thus, the stabilizer 64 has upper and lower attachment mechanisms 88, 94 disposed on either side 67, 68 of the stabilizer 64. In assembly, the stabilizer 64 is attached to a connecting wall 118 of an upright, such as upright 50 shown in FIGS. 4A and 4B, through a receiving aperture 98 and a receiving cradle 100. The upright-receiving aperture 98 narrows to a channel 99, such that, as the snap-fit attachment flange 88 is inserted into the upright-receiving aperture 98, the assembler of the retail cart will press downward vertically on the upper crossbar 82 of stabilizer 64 to create a snap-fit engagement of the snap-fit attachment flange 88 within the channel 99 of the upright-receiving aperture 98. In this way, the middle portion 85 of crossbar 82 having an I-beam configuration is retained within the channel 99 of upright-receiving aperture 98. The retainment member 89 of the snap-fit attachment flange 88 further retains the stabilizer 64 in the snap-fit engagement, as shown in FIG. 4B and further shown in FIG. 5A.

The biasing member 90 disposed on the retaining member 89 further increases the force and frictional fit of the stabilizer as attached to upright 50 to ensure a solid retention. The snap-fit attachment flange 88 is received in the upright-receiving aperture 98 as indicated by the dotted lines in FIG. 4A. As the stabilizer 64 is pushed downward to create the snap-fit engagement, the lower attachment flange 94 of the stabilizer 64 is received in the upright receiving cradle 100, which further comprises a channel 101 which is engaged by the retainment member 95 of the lower attachment flange 94. In this way, the stabilizer 64 creates counteracting forces indicated by arrows A and B. As shown in FIG. 4B, force A is created by the engagement of the snap-fit attachment flange 88 to the channel 99 of the upright-receiving aperture 98, and, more specifically, by forces created by the biasing member 90 of the snap-fit attachment flange 88 acting on the interior structure of the upright 50. Opposing forces, as indicated by arrow B, are imparted on the upright 50 by the engagement of the lower attachment flange 94 to the upright-receiving cradle 100. In this way, the stabilizers 64 provide solid support to upright 50 and are positively captured thereon to provide rigidity to the overall structure of the retail cart.

Much like the first and second side attachment members 40, 42, the handle members 58 and the stabilizers 64, 66 are comprised of an injection molded thermal reinforced plastic. The handle members 58 and the stabilizers 64, 66 are not side specific much like the first and second side attachment members 40, 42. Thus, any stabilizer can be used at the upper or lower stabilizer attachment location and any handle member can be attached to the cart at a tube-like receiving channel 56 as shown in FIG. 4. Having polymeric parts that are not right, left, front or rear specific aids in the ease of assembly of the cart.

Figure 5:
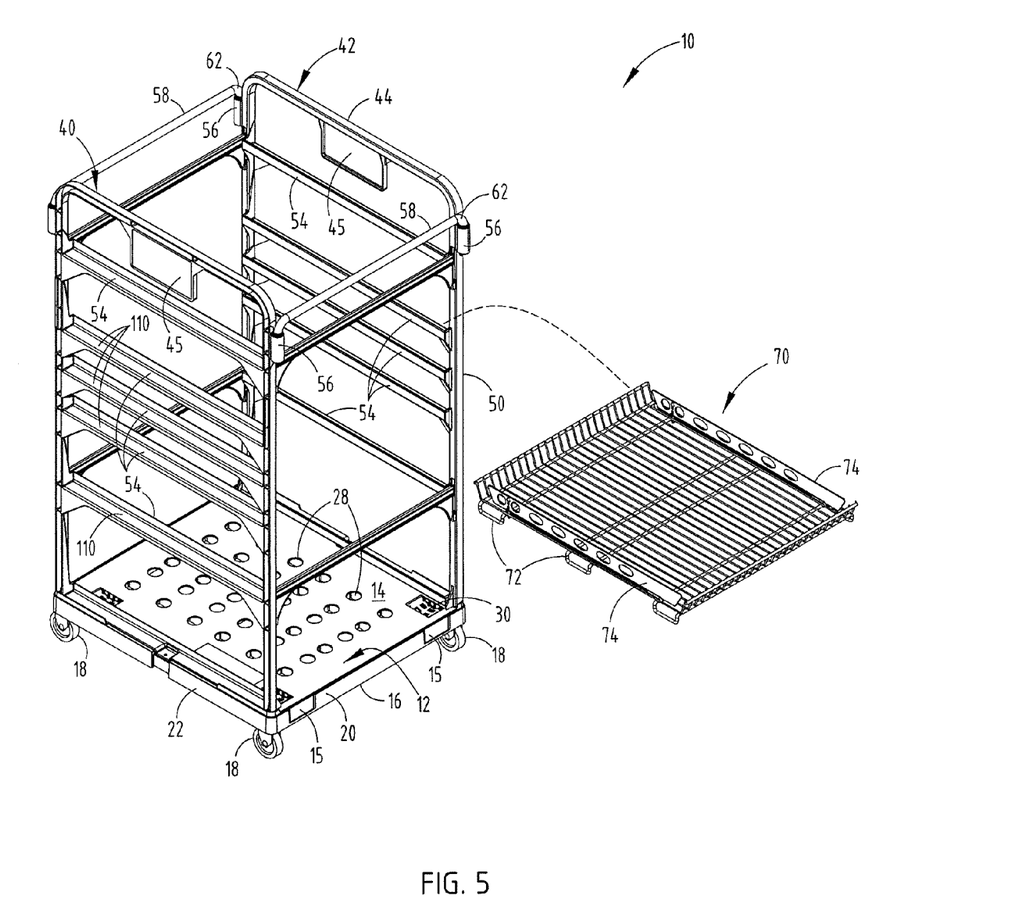
FIG. 5 is a perspective view of a retail cart and a shelving unit of the present invention.

Referring now to FIG. 5, a retail cart 10 is shown with a shelving unit 70 removed therefrom. Shelving unit 70 is slideably received on any one of the plurality of support members 54 at various vertical locations. Specifically, the shelving unit 70 is received at shelf-receiving channels 110 disposed on the support members 54 and as further shown in FIGS. 5A-5C.

Figure 5A:
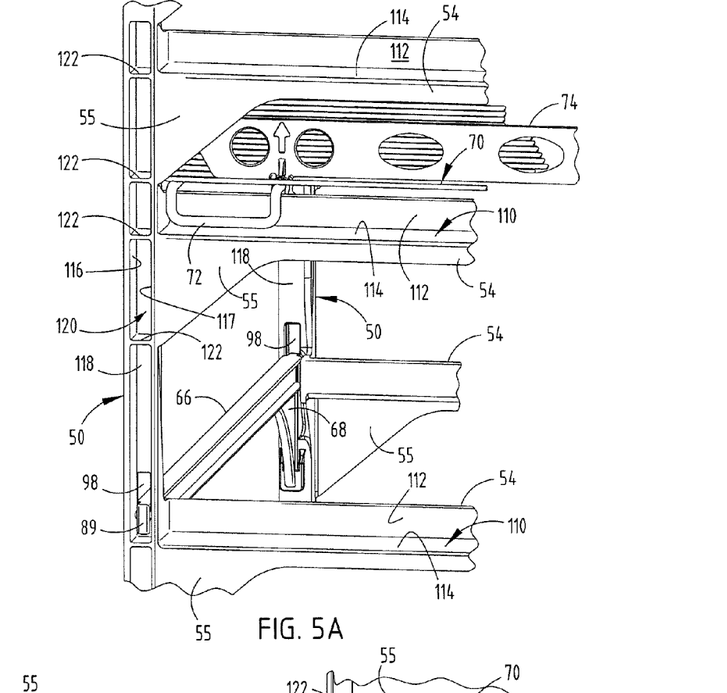
FIG. 5A is a fragmentary perspective view of a support member having a shelf receiving channel.

Referring to FIG. 5A, the shelf-receiving channels 110 essentially comprise an L-shaped configuration having an upright vertical wall 112 and a horizontal landing wall 114. The shelving unit support guides 72 are slideably received and engaged with the shelf-receiving channels 110 of the support members 54. As further shown in FIG. 5A, the uprights of the first and second side attachment members, exemplified by front upright 50 shown in FIG. 5A, have a generally U-shaped configuration with first and second side walls 116, 117 with a connecting wall 118 connecting the first and second side walls 116, 117. In this way, the side walls 116, 117 and connecting wall 118 create a U-shaped configuration of the upright 50 having a channel 120 disposed along a length of the upright. A plurality of reinforcement members 122 are disposed along a length of the upright 50 connecting to side walls 116, 117 and connecting wall 118 to provide rigidity and support to the upright 50.

Figure 5B:
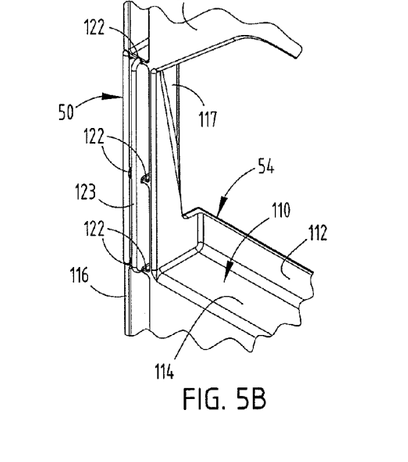
FIG. 5B is a fragmentary perspective view of a support member having a shelf receiving channel.
Figure 5C:
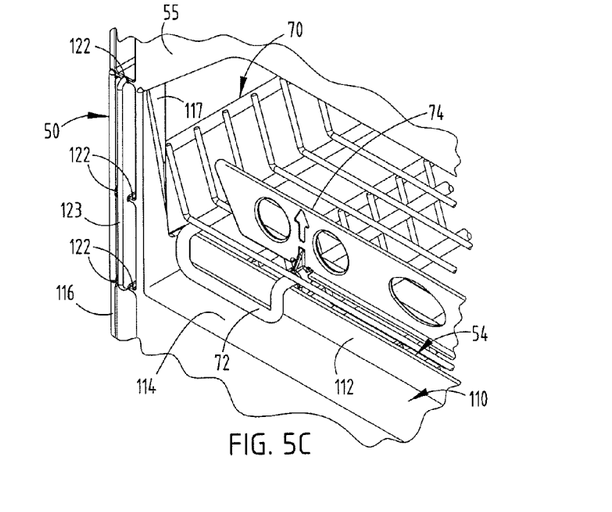
FIG. 5C is a fragmentary perspective view of a support member engaged with a shelving unit.

As shown in the embodiment in FIG. 5B, a vertical reinforcement member 123 is disposed in the channel 120 to further provide rigidity to the upright 50. As shown in FIG. 5C, a shelving unit 70 is shown disposed and slideably received in a shelf-receiving channel 110 of a support member 54 by engagement of the shelving unit support guides 72. In assembly, it is contemplated that the shelving unit 70 can be fully removed from the retail cart 10, as shown in FIG. 5, or fully received in the retail cart 10, as shown in FIG. 1. The shelving units 70 can also be partially removed from the retail cart 10 as necessary for use by the retail cart user.

Figure 6:
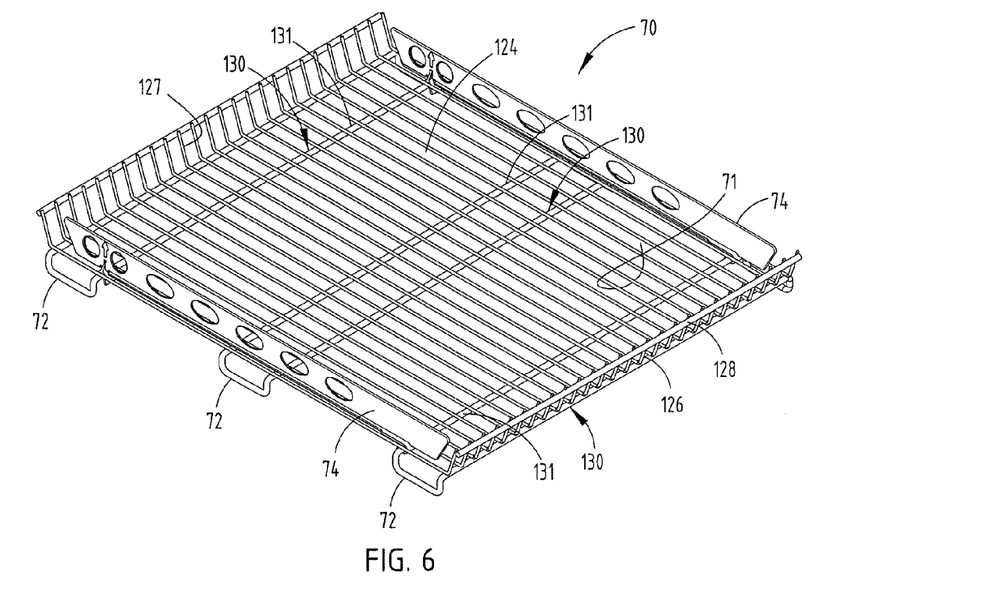
FIG. 6 is a perspective view of a shelving unit.
Figure 7:
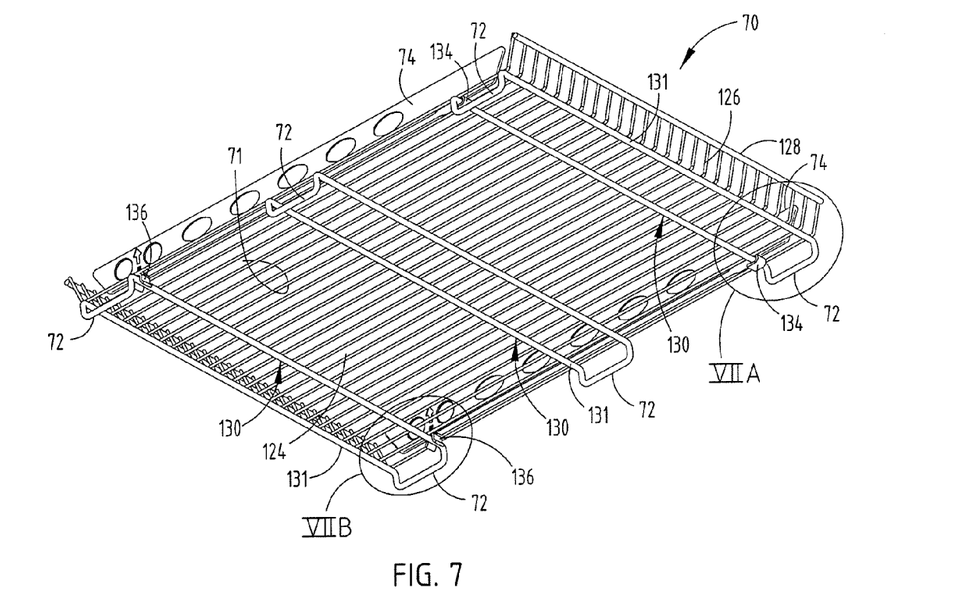
FIG. 7 is a perspective view of a shelving unit.

Referring now to FIGS. 6 and 7, a shelving unit 70 is shown removed from the retail cart. Shelving units 70 are contemplated to be wire shelving units having a series of parallel spaced-apart wire members 71. The wire members 71 create a landing area 124 for receiving items to be stored on the retail cart. The shelving units 70 further comprise front and rear retaining walls 126, 127 which, in the embodiment shown in FIGS. 6 and 7, are comprised of bends in the wire members 71 culminating in a top or upper crossbar 128. The bends in the wire members 71 are strategically placed such that the landing areas 124 of the shelving units 70 are maximized with respect to the cart configuration. In this way, the shelving units 70 do not waste space used to store items. Attached to an underside of the landing area 124 are essentially rectangularly shaped supports 130 which connect to wire members 71. The rectangular shaped support members 130 culminate at either end in the shelving unit support guides 72 which are created by bending the support members 130 in assembly. Therefore, the support members 130 have horizontal support rails 131 attached to the wire members 71, and vertical shelving unit support guides 72, which slideably engage support members 54 at receiving channels 110 in assembly.

Figures 7A, 7B:
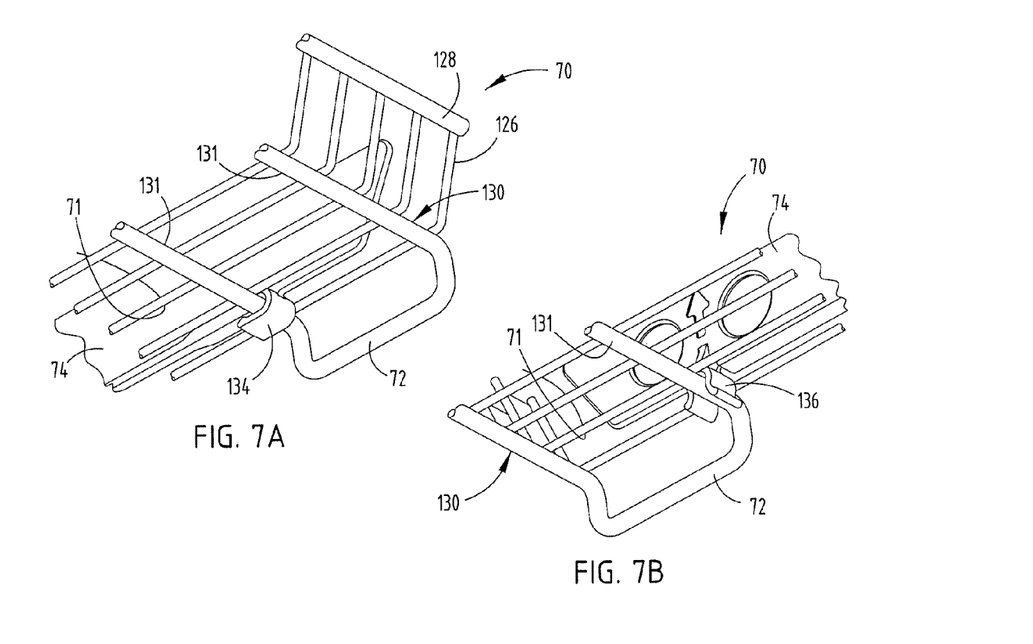
FIGS. 7A and 7B are fragmentary perspective views of a shelving unit and a divider assembly.
Figure 8:
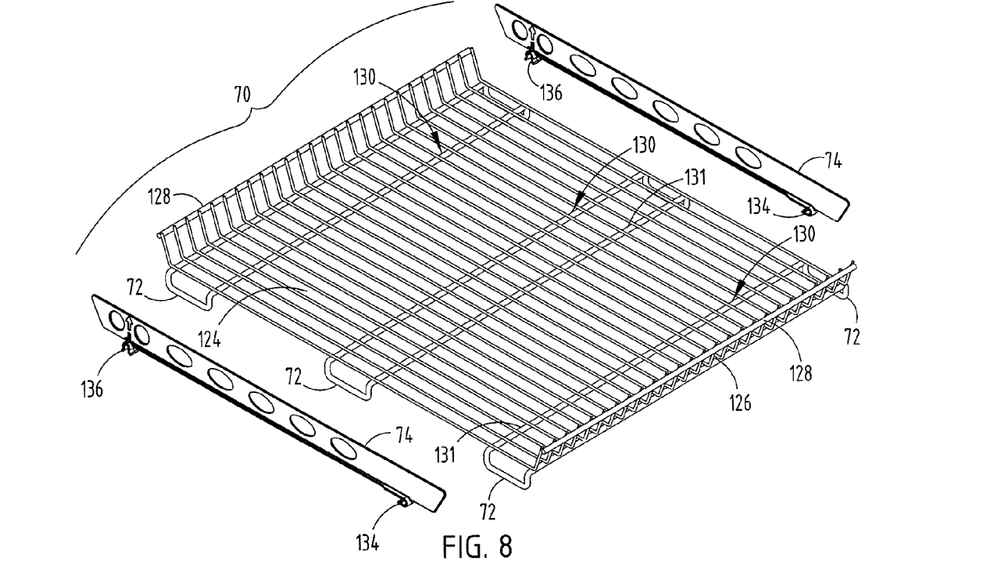
FIG. 8 is an exploded perspective view of a shelving unit and divider assemblies.

As shown in FIG. 8, removable polymeric dividers 74 are removed from a shelving unit 70 and can be placed anywhere along the landing area 124 of the shelving unit 70 for dividing merchandise and other items as stored on shelving unit 70. As shown in FIGS. 7A and 7B, the dividers 74 comprise clips for retaining the dividers 74 along the landing area 124 of shelving unit 70. Specifically, the dividers 74 comprise front clips 134 and rearward clips 136 disposed on the bottom of the dividers 74 for engagement of the horizontal bars 131 of the support members 130. In assembly, the front clips 134 of the dividers 74 are laterally opening clips which are attached to a horizontal bar 131 of support members 130, as shown in FIG. 7A. Once the front clip 134 of divider 74 is secured to horizontal support bar 131 of a first support member 130, the divider 74 is rotated downward for engagement of the rearward clip 136, which is a horizontally opening clip, to a horizontal bar 131 of a second support member 130 disposed on the shelving unit 70. In this way, the dividers 74 remain removably attached to the shelving unit 70, as shown in FIG. 6, and can be placed as needed along the landing area 124 of the shelving unit 70 for organizing and storing merchandise.

Figure 9:
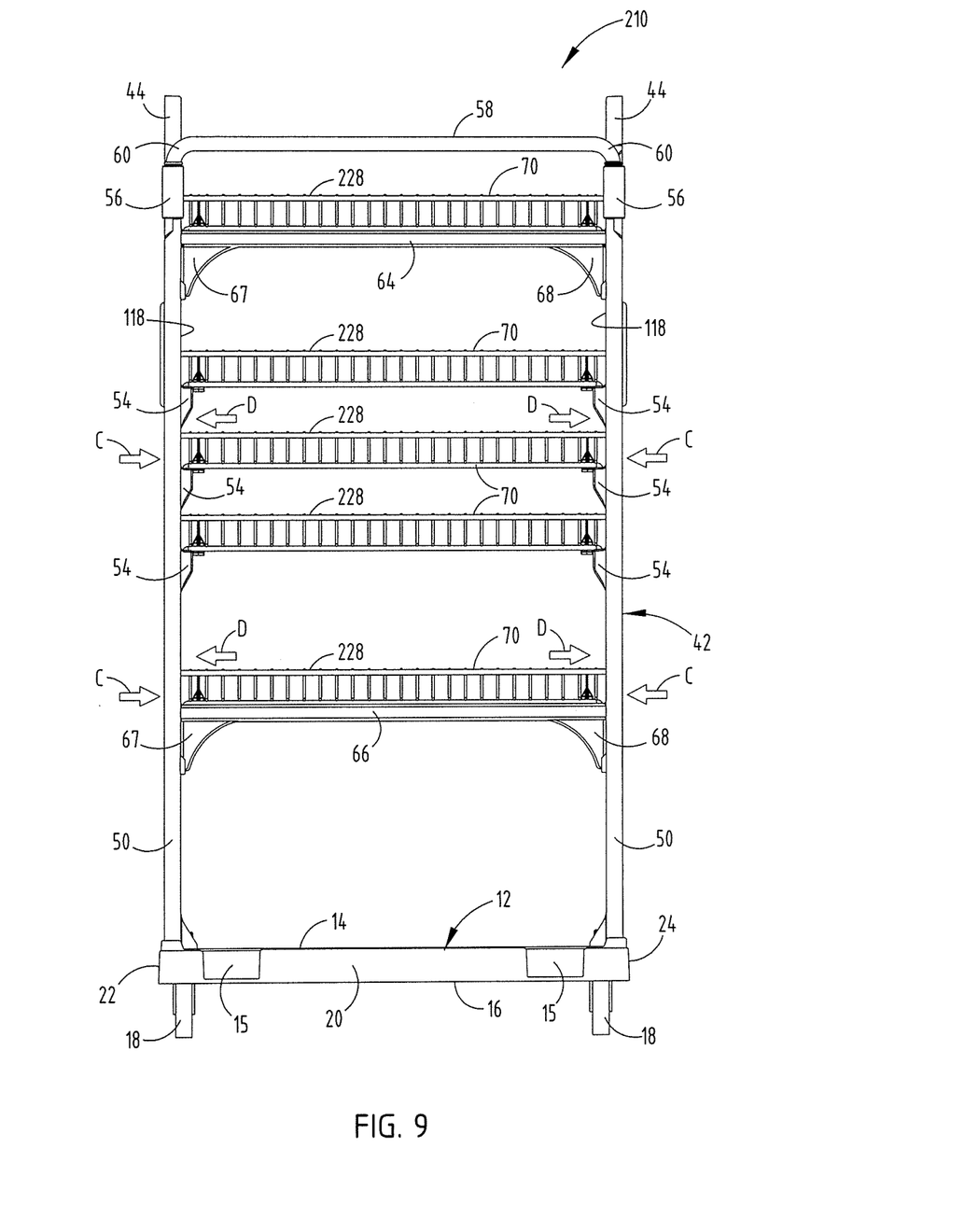
FIG. 9 is a front elevational view of a retail cart according to another embodiment of the present invention.

Referring now to FIG. 9, another embodiment of a retail cart 210 is shown having essentially the same characteristics and features as found on the retail cart 10 shown in FIG. 2. In the embodiment shown in FIG. 9, the shelving units 70 have a top crossbar 228 which contacts the first and second side attachment members 40, 42 when the shelving unit 70 is fully stowed within the retail cart 210. This contact creates a lateral outwardly force indicated by arrows D on the first and second side attachment members 40, 42. As further shown in FIG. 9A, the top crossbar 228 extends to contact connecting wall 118 of the upright 50, such that opposing forces are created as indicated by arrows C and D. A first force is created by the shelving assembly 70, as indicated by arrow D, due to the top crossbar 228 acting on the connection wall 118 of the upright 50 as described above. Further, an opposing force, as indicated by arrow C, is exerted upon the shelf-receiving channel 110 of the support member 54 by the interaction of the shelving unit support guide 72 acting on the vertical wall 112 of the shelf-receiving channel 110. In this way, as the shelving units 70 are fully stowed within the retail cart 210, the shelving units 70 lend support and rigidity to the overall retail cart assembly by the interaction of the opposing forces C and D as shown in FIG. 9. It is noted that the opposing forces C and D act on both side attachment members 40, 42 at both the front and rear uprights 50, 52 in assembly.

Figure 10:
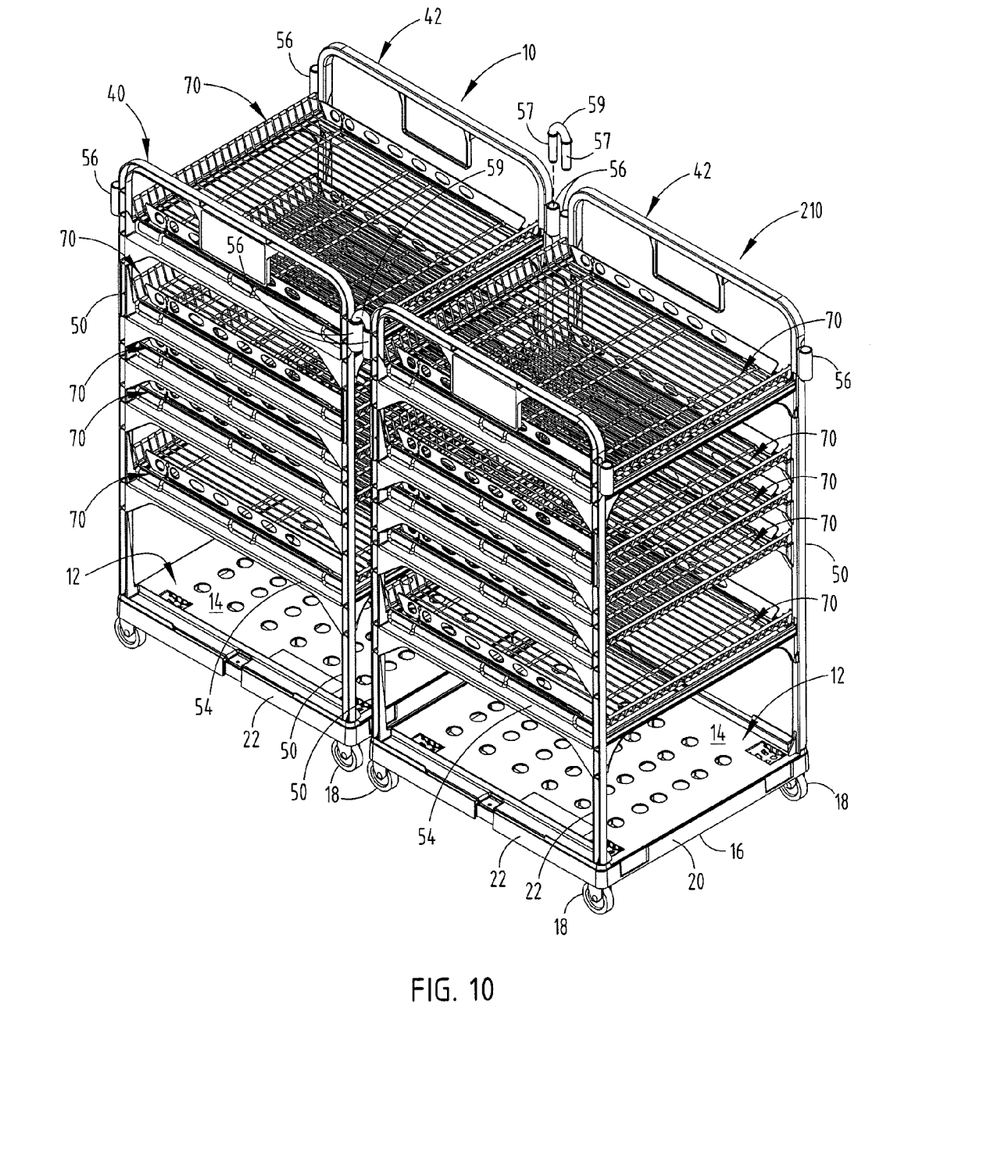
FIG. 10 is a perspective view of two retail carts linked together with connecting brackets.

Referring now to FIG. 10, a retail cart 10 is shown as coupled to a second retail cart 210. The carts 10, 210 are operably coupled to one another using U-shaped connecting bracket 59 having connecting members 57 which operably engage receiving channels 56 disposed on the upper ends of the first and second side attachment members 40, 42 of both carts 10 and 210. Thus, any number of retail carts can be linked together using brackets 59. In assembly, a cart 10 can be linked to a second cart 210 by removing the handle member 58 and installing a U-shaped bracket 59. It is contemplated that a chain of carts can be easily maneuvered by installing mobile transport rollers 18 on the base unit 12 of adjacent carts, with swivel casters disposed on the distal ends of carts at the beginning and end of the chain of carts.

Figure 9A:
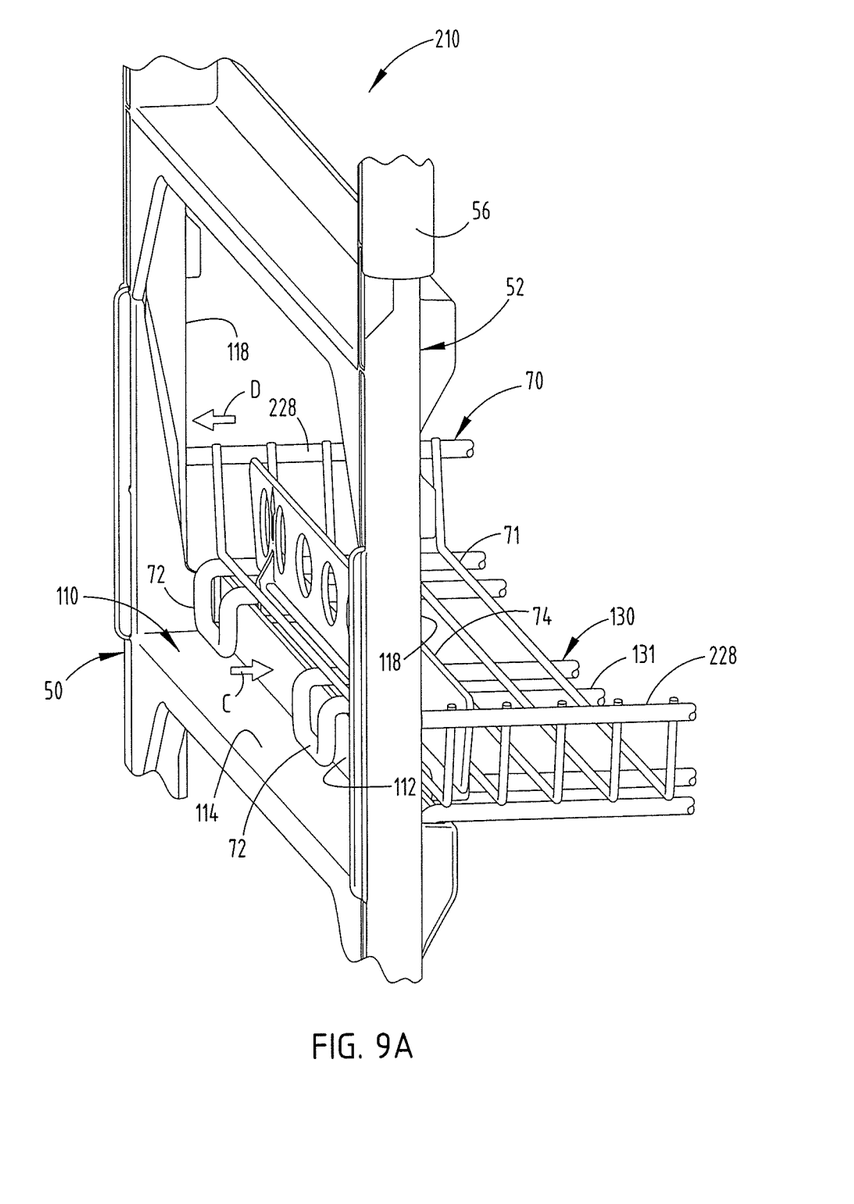
FIG. 9A is a fragmentary perspective view of the shelving unit and side attachment member.

Referring now to FIGS. 4A, 4B, it has been surprisingly discovered that the engagement of the stabilizers 64, 66 to the first and second side attachment members 40, 42 using the upper and lower attachment mechanisms 88, 94 disposed on both the first and second ends 67, 68 of the stabilizers 64, 66 creates rigid engagement due to the opposing forces A and B (FIG. 4A). The upper attachment mechanisms 88 impart a first lateral force A on an associated upright, and the lower attachment mechanisms 94 impart a second lateral force B in opposition to the first force A on the associated upright 50. Further, it has been surprisingly discovered that the shelving units 70, as shown in FIGS. 9 and 9A, also create opposing lateral forces C and D by the interaction of the top crossbars 228 of the shelving unit 70 connecting with connecting wall 118 of the upright 50 to create a first force D, and the shelving unit supports 72 imparting a second lateral force C on the shelf receiving channels 110 in an opposing direction relative to the first lateral force D when the shelving unit 70 is in a stowed position on the cart. With the interaction of the shelving units 70 with the first and second side attachment members 40, 42, the shelving units 70 add rigidity to the overall cart structure simply by being stowed thereon. Further rigidity is added as the shelving units are stocked with merchandise. Thus, the shelving units 70 are positively captured between the uprights of the first and second side attachment members 40, 42, yet are easily removed and slideable when the cart user desires.

It will become apparent to those skilled in the art that various modifications to the preferred embodiment of the invention as described herein can be made without departing from the spirit or scope of the invention as defined by the appended claims.

The invention claimed is:

1. A retail cart for use in transporting merchandise, comprising:

a polymeric base unit having an upper side and an underside;

a plurality of mobile transport rollers coupled to the underside of the base unit; first and second polymeric side attachment members operably coupled to the upper side of the base unit in a generally upright, parallel, laterally spaced-apart relationship, wherein each side attachment member includes an outer frame member comprising an upper crossbar, a lower crossbar and laterally spaced apart front and rear uprights;

a plurality of polymeric support members having shelf receiving channels are disposed between the laterally spaced uprights of each side attachment member, each shelf receiving channel including an upright vertical wall and a horizontal landing wall that are connected to form a substantially L-shaped cross section defining an opening that faces outwardly away from a central position of the retail cart;

at least one shelving unit slideably and removably received in the shelf receiving channels of the support members, wherein the at least one shelving unit is slideably supported in the shelf receiving channels between a stowed position and forward or rearward extended positions, further wherein the at least one shelving unit extends at least partially beyond the front uprights in the forward extended position, and extends at least partially beyond the rear uprights in the rearward extended position;

and a plurality of stabilizers removably and operably coupled to an upright of the first side attachment member at a first end and operably coupled to an upright of the second side attachment member at a second end, wherein the first and second ends of each stabilizer include upper and lower attachment flanges adapted to be received in one of a receiving aperture and a receiving cradle disposed on the uprights of the first and second polymeric side attachment members, wherein each upper attachment flange comprises a downwardly extending retaining member; wherein each receiving cradle protrudes from a respective upright and defines a vertical channel which receives a corresponding lower attachment flange; wherein each retaining member of said upper attachment flanges defines a hook that clamps on to a bottom wall of a corresponding receiving aperture of a corresponding upright;

and further wherein the upper and lower attachment flanges impart opposing forces on the upright as coupled thereto.

2. A retail cart as set forth in claim 1, wherein:

the shelving unit is a wire shelving unit having a plurality of parallel spaced wire members defining a landing area, and further wherein the wire members define retaining walls having top crossbars.

3. A retail cart as set forth in claim 2, wherein:

the shelving unit further comprises a plurality of support rails having shelving unit supports adapted to engage the shelf receiving channels.

4. A retail cart as set forth in claim 3, wherein:

the top crossbars of the retaining walls of the shelving unit impart a first lateral force on the front and rear uprights of the first and second side attachment members, and further wherein shelving unit support guides impart a second lateral force on the upright vertical walls of the shelf receiving channels in an opposing direction relative to the first lateral force when the shelving unit is in the stowed position.

5. A retail cart as set forth in claim 3, including:
a plurality of dividers adapted to engage the support rails of the shelving unit to divide the landing area.

6. A retail cart as set forth in claim 1, wherein:
the uprights of the first and second side attachment members comprise a generally U-shaped cross section with a channel having a plurality of reinforcement members disposed therein.

7. A retail cart for use in transporting merchandise, comprising: a polymeric base unit having an upper side and an underside; a plurality of mobile transport rollers coupled to the underside of the base unit; first and second polymeric side attachment members operably coupled to the upper side of the base unit in a generally upright, parallel, laterally spaced-apart relationship, wherein each side attachment member includes a frame member comprising upper and lower crossbars and laterally spaced apart front and rear uprights having a plurality of support members disposed between the laterally spaced uprights, each support member including a shelf receiving channel having an upright vertical wall and a horizontal landing wall that are connected to form a substantially L-shaped cross section defining an opening that faces outwardly away from a central position of the retail cart;
a plurality of stabilizers operably coupled to an upright of the first side attachment member at a first end and operably coupled to an upright of the second side attachment member at a second end; a plurality of removable shelving units slideably received in the shelf receiving channels of the support members, wherein the shelving units further include; a landing surface disposed between laterally spaced apart retaining edges having upper cross bars, wherein the upper crossbars are positively captured between an upright of the first side attachment member at a first end and an upright of the second side attachment member at a second end when the shelving unit is in a fully stowed position thereby imparting a first lateral force on the first and second side attachment members; and
a plurality of downwardly extending; U-shaped shelving unit support guides disposed on the plurality of removable shelving units for engaging the vertical walls of the shelf receiving channels of the support members;
further wherein the shelving unit support guides impart a second lateral force on the upright vertical walls of the shelf receiving channels in an opposing direction relative to the first lateral force when the shelving unit is in the stowed position.

8. A retail cart as set forth in claim 7, including:
a plurality of dividers adapted to engage the shelving unit to divide the landing area.

9. A retail cart as set forth in claim 7, wherein:
the uprights of the first and second side attachment members comprise a generally U-shaped cross section with a channel having a plurality of reinforcement members disposed therein.

10. A retail cart as set forth in claim 7, wherein:
the mobile rollers comprise casters.

11. A retail cart for use in transporting merchandise, comprising: a base unit having an upper side and an underside;
a plurality of mobile transport rollers coupled to the underside of the base unit; first and second side attachment members detachably coupled to the upper side of the base unit in a generally upright, parallel, laterally spaced-apart relationship, wherein each side attachment member includes a one-piece polymeric frame member comprising an upper crossbar, a lower crossbar and laterally spaced apart front and rear uprights; wherein the front and rear uprights each comprise receiving apertures and receiving cradles that protrude from the respective uprights;
a plurality of stabilizers operably coupled to an upright of the first side attachment member at a first end and operably coupled to an upright of the second side attachment member at a second end, wherein the first and second ends of each stabilizer include upper and lower attachment flanges adapted to be received in one of the corresponding receiving apertures and one of the corresponding receiving cradles disposed on the uprights of the first and second polymeric side attachment members, wherein each upper attachment flange comprises a downwardly extending retaining member; wherein each receiving cradle defines a vertical channel which receives a corresponding lower attachment flange; wherein each retaining member of said upper attachment flanges defines a hook that clamps on to a bottom wall of a corresponding receiving aperture of a corresponding upright; and further wherein the upper and lower attachment flanges impart opposing forces on the upright as coupled thereto;
a plurality of support members disposed between the laterally spaced uprights of each of the side attachment members having outwardly facing shelf receiving channels disposed thereon, and at least one removable shelving unit slideably supported on the shelf receiving channels of the support members between stowed and forward and rearward extended positions, wherein the at least one shelving unit extends at least partially beyond the front uprights in the forward extended position, and extends at least partially beyond the rear uprights in the rearward extended positions.

12. A retail cart as set forth in claim 11, wherein:
the shelving unit is a wire shelving unit having a plurality of parallel spaced wire members defining a landing area, and further wherein the wire members define retaining walls having top crossbars.

13. A retail cart as set forth in claim 12, wherein:
the shelving unit further comprises a plurality of support rails having shelving unit support guides adapted to engage horizontal landing walls of the shelf receiving channels.

14. A retail cart as set forth in claim 13, wherein:
the top crossbars of the retaining walls of the shelving unit impart a first lateral force on the uprights of the first and second side attachment members, and further wherein the shelving unit support guides impart a second lateral force on upright vertical walls of the shelf receiving channels in an opposing direction relative to the first lateral force when the shelving unit is in the stowed position.

15. A retail cart as set forth in claim 11, including:
at least one handle member operably coupled to an upright of the first side attachment member at a first end and operably coupled to an upright of the second side attachment member at a second end.

16. A retail cart as set forth in claim 11, including:
at least one connecting bracket adapted to couple the retail cart to one or more additional retail carts, thereby forming a chain of retail carts.

17. A retail cart as set forth in claim 16, including:
at least one divider adapted to divide the landing area of the shelving unit, wherein the at least one divider comprises a first laterally opening clip and second horizontally opening clip adapted to engage the support rails of the shelving unit.

\* \* \* \* \*